United States Patent

Pijlman et al.

(10) Patent No.: US 9,185,780 B2
(45) Date of Patent: Nov. 10, 2015

(54) LIGHTING CONTROLLER, LIGHTING SYSTEM AND LIGHTING CONTROL METHOD

(71) Applicant: KONINKLIJKE PHILIPS N.V., Eindhoven (NL)

(72) Inventors: Fetze Pijlman, Eindhoven (NL); Jasper Van Dorp Schuitman, Eindhoven (NL); Armin Gerhard Kohlrausch, Eindhoven (NL); Okke Ouweltjes, Veldhoven (NL); Stefan Henricus Swinkels, Valkenswaard (NL); Michel Cornelis Josephus Marie Vissenberg, Roermond (NL); Ronaldus Maria Aarts, Geldrop (NL); Cornelis Henridricus Bertus Arnoldus Van Dinther, Mierlo (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/401,139

(22) PCT Filed: May 8, 2013

(86) PCT No.: PCT/IB2013/053705
§ 371 (c)(1),
(2) Date: Nov. 14, 2014

(87) PCT Pub. No.: WO2013/171627
PCT Pub. Date: Nov. 21, 2013

(65) Prior Publication Data
US 2015/0102745 A1    Apr. 16, 2015

Related U.S. Application Data

(60) Provisional application No. 61/646,939, filed on May 15, 2012.

(51) Int. Cl.
H05B 37/02 (2006.01)
G08B 21/04 (2006.01)
G08B 21/06 (2006.01)

(52) U.S. Cl.
CPC ........ *H05B 37/0227* (2013.01); *G08B 21/0469* (2013.01); *G08B 21/06* (2013.01); *H05B 37/0236* (2013.01); *H05B 37/0245* (2013.01)

(58) Field of Classification Search
CPC ........................ H05B 37/0236; H05B 37/0227
USPC .................................. 315/291, 292, 307, 308
See application file for complete search history.

(56) References Cited

U.S. PATENT DOCUMENTS

| 2006/0071605 | A1 | 4/2006 | Diederiks |
| 2008/0265799 | A1* | 10/2008 | Sibert ........................... 315/292 |
| 2010/0194314 | A1 | 8/2010 | Sato et al. |
| 2012/0029665 | A1 | 2/2012 | Perry |

FOREIGN PATENT DOCUMENTS

| DE | 202004003083 | U1 | 5/2004 |
| JP | 60030915 | A | 2/1985 |

* cited by examiner

*Primary Examiner* — Daniel D Chang
(74) *Attorney, Agent, or Firm* — Meenakshy Chakravorty

(57) ABSTRACT

In a lighting system, sound levels are detected in the vicinity of at least one lighting unit to determine when there is a sound level above a threshold. The illumination provided by the lighting unit is adapted in such a way as to encourage a reduction of noise generation.

15 Claims, 5 Drawing Sheets

LIGHTING CONTROLLER, LIGHTING SYSTEM AND LIGHTING CONTROL METHOD

CROSS-REFERENCE TO PRIOR APPLICATIONS

This application is the U.S. National Phase application under 35 U.S.C. §371 of International Application No. PCT/IB2013/053705, filed on May 8, 2013 which claims the benefit of U.S. Provisional Patent Application No. 61/646,939, filed on May 15, 2012. These applications are hereby incorporated by reference herein.

FIELD OF THE INVENTION

The invention relates to a controller for a lighting system, a lighting system including the controller and a method of illuminating a space using the controller and/or lighting system. The invention is useful for illumination of open plan spaces of all sorts, such as e.g. open plan offices, where sound levels caused by human activity are desired to be actively controlled and preferably kept at an acceptable level.

BACKGROUND OF THE INVENTION

An increasing number of office workers are located in open plan offices. In such offices, but also in other instances, a common complaint is that people have difficulties in doing their job because of annoying and distracting sounds around them. The most distracting sound source in open plan offices is speech, in particular speech resulting from (informal) meetings of people. The participants to the meeting need to have a high level of speech intelligibility, while other people who are not participating in the meeting are annoyed and distracted by the (unwanted) speech.

Conventional means to reduce the distractions of speech are blocking and/or absorbing the sound with walls between the desks. This can be quite effective, but it destroys the open character of the space and the benefits that this brings with respect to collaboration of people in the open plan office. Distraction by speech may also be reduced by sound masking (adding noise). This preserves the openness of space, but it also raises the general sound level in the office.

One approach proposed by the applicant is to provide localised sound amplification, with the amplified output provided in a directional manner. In this way, local speech amplification is used, for example above a meeting table, in order to improve the audibility of a conversation in that environment, but to reduce the disturbance to the neighbouring areas. This approach enables users to speak more softly and still be heard in their localised area, by means of the amplification system. However, if the noise level does increase, the users of this system may not perceive that their conversation is becoming so loud that it is disturbing others nearby.

There are also examples of lighting system which aim to provide lighting to an area which matches the activity taking place in the area, and this activity can be detected based on the measured sound. For example, US20060071605A1 discloses a system in which the "activity" of people is measured for example using microphones, and this is used to control a light source. This is, for example, to adapt the light to a certain task. US20100194314A1 discloses that lighting can be adjusted based on measured sound to change the "atmosphere" of a space.

There can still remain a problem that the noise level introduced by people in one part of an open area is disturbing to others in a nearby area.

SUMMARY OF THE INVENTION

It is an object of the invention to reduce the aforementioned noise disturbance problem. The object is achieved by the invention as defined by the independent claims. The dependent claims define advantageous embodiments.

According to the invention, there is provided a controller for a lighting system, a lighting system including the controller and a method of illuminating a space that can be performed using the controller and/or the lighting system.

The controller is capable of obtaining multiple values of one or more parameters that are characteristic of a sound for sounds (first and second sound) that can come from and are detected in different locations in a space. The controller is then further capable of using one of the values of the parameter of a sound (of the second sound) as a reference value for checking whether the value (sound) of the parameter of the other sound (first sound), which stems from another location in space, deviates from that reference value. The value of the second sound may thus provide a measure of the background sound to compare with the first sound. The controller is then able to adjust illumination at the location where the first sound was detected based on the determined deviation.

With this function, the controller is able to adapt illumination/lighting provided by a lighting system to one area of the space where, e.g. the sound level exceeds the background sound level in such a way that people responsible for that sound level are induced to reduce their sound generation such as e.g. by lowering their voice level. People located at the area of the space where the second sound was detected then experience reduced sound/noise disturbance form the people within the other area. This effect may be induced through acquired behaviour obtained through training. More particularly, adjustment of illumination may be a change in illumination which people have been trained to recognise as an indication that they need to lower the noise levels. For example, the lighting may change to or towards a specific colour (e.g. from one colour to another) or it may follow a recognised intensity pattern, such as dimming and brightening in a cycle. Flicker of light may be employed. The invention can also be used to exploit more intuitive mechanisms such as those according to which people automatically lower their voices when illumination is dimmed.

Thus in general, the invention enables the use of altered lighting conditions that are designed to encourage a change in sound levels where a preferred effect is a reduction in sound levels (which will be perceived as noise to people in other areas of the room) in the vicinity of the lighting unit where the sound level was detected.

The controller enables the lighting system to provide feedback within a lighting signal provided to a group of people located in one part of a space or room. As said, the feedback is based on differences between the sound level at the location of the group and a reference value such that the signal induces alteration of speech level in that location, such that general differences between sound levels in the room can decrease. The reference noise level is an active reference noise level. Thus, the lighting system encourages people to decrease conversation volume based on the general conversation noise level in the room.

In the invention, a characteristic parameter of sound can be, but is not limited to: the sound level, the sound frequency range, the sound rhythm, the pitch and/or others. The illumination feedback may be based on one of these parameters or a combination of two or more of them. Thus multiple parameters may be used to provide feedback. One preferred parameter is the sound level giving opportunity to influence the sound level in a space through illumination feedback. Alternatively sound frequency range can be used as the parameter on its own, or in combination with the sound level parameter to provide feedback. This allows filtering on types of sound such as those including higher frequency sounds that can be more disturbing than lower frequency sound.

Obtaining a value of a parameter by the controller may comprise the receiving of the parameter value through any kind of communication types and devices. Alternatively, obtaining a value of a parameter can include receiving a signal (e.g electrical signal) representing the sound and determination of the parameter value form such a signal by the controller. For example from certain electrical signal data the sound level may be determined. Software may be implemented in the controller to accomplish this.

Determining a deviation of the value of the parameter from the reference value can be the calculation of a difference, or the calculation of a quotient of the value and the reference value followed by its comparison with a standard value such as 1. Other methods may be employed also. Preferably a difference calculation is performed. When frequency ranges are involved deviations may comprise comparison of frequency ranges and distinguishing between frequency ranges in ways usual for sound analysis. Maximum or minimum frequencies of the ranges may be used for determining deviations. Or even non-overlap regions between ranges.

Basing the reference value of the parameter may comprise a number of options. In one embodiment, the value of the parameter of the second sound may be the average value of a parameter of multiple sounds detected at multiple locations in a space so that the reference value represents an average sound. In another embodiment, the reference value of the parameter is an average value determined from the values of the parameter of the first sound and the second sound optionally including also the third sound. In this embodiment it is controller that determines the average value of the different values of the parameter. The, value of the parameter of the first sound may be excluded from the reference value such that the reference value indeed represents only the surrounding background of a location.

The values of the parameters of the sounds may be averaged before determining the deviation. Alternatively, there may be determined multiple deviations, e.g. one for the first and one for the third sound with respect to the value of the parameter of the second sound, after which the deviations are averaged to obtain the deviation used of the adjustment.

Other algorithms for basing the reference value of the parameter on at least the value of the parameter of the second sound can be used. Self learning algorithms can be used also. Neural network like construction are possible.

Obtaining a threshold value of the parameter by the controller can mean loading a value for the parameter from a memory that is part of the controller. The threshold value preferably can be set (and possibly stored in the memory if applicable) by a user, e.g. by making use of an input device. Thus, e.g. the threshold value can be a high limit value for the sound level or for the frequency range of the sound. The threshold value of the parameter enables to set a limit for the background sound. Thus, e.g. if the background sound (represented by the second sound) is already louder than the threshold value represents, the controller can be configured such that it checks this and based on the outcome of the check sets the reference value to the threshold value instead of the value for the parameter of the second sound for representing the background sound. This setting can be permanent, or can be temporary. Such checking and setting of the reference value to the threshold value can be done for one or more of the other parameters described above also.

Alternatively or additionally, the threshold value or a further threshold value can be used to define a minimum deviation that needs to be surpassed by the actual determined deviation of the value of the parameter of a first sound with respect to the reference value before actual adjustment of the illumination takes place. Thus, the adjustment of illumination is buffered, i.e. a certain defined deviation is allowed within a boundary without actual feedback through lighting adjustment to occur. While deviation of parameter values within the boundary may be perceived as relatively undisturbing, this embodiment thus provides a balance between feedback using illumination changes without making the illumination adjustments themselves becoming disturbing. The embodiment provides more stable illumination.

Preferably the average parameter of the sound signals is only determined from parameters that do not exceed the threshold parameter value. The controller can be configured to check whether values of a parameter are higher than the threshold value to then decide to discard the values for basing the reference value on.

The controller typically is a controller for controlling illumination in open plan roomsspaces such as open plan offices or hospital environments where some people work or perform activities that require illumination and a certain amount of quietness while other people need to talk or perform activities that can cause disturbing sounds such as noise.

The controller typically is an electronic device comprising an electrical circuit and/or an integrated circuit. These can be manufactured using methods known in the art. The electronics are designed to have components that fulfil the functions as defined by the invention.

The controller can comprise communication devices for obtaining the values of the parameters. The communication of sound data, which includes sound signals, or values of parameters of the sound, between one or more controllers mutually, or between a controller and a sound sensors can be through wiring or may be wireless. Wiring may be dedicated wiring, or wiring already present for other purposes such as UTP cabling, or even the power supply network through which for example also the lighting units are driven. In the wireless case a controller comprises at least a receiver for obtaining the sound data. Preferably, especially when there are more controllers in a lighting system, which mutually communicate, a controller also comprises a transmitter for transmitting sound data.

Communication may be done via usual wireless communication protocols or standards or via the emitted light in a manner that is invisible to the human eye (for example using 100 MHz PWM LEDs). Thus, communication of sound signal or values of parameter(s) of a sound can occur via light coding.

The controller can be a central controller capable of adjusting illumination of one or more lighting units capable of illuminating mutually different locations of a. Each lighting unit is adapted to communicate with the central controller, e.g. through a communication device (transmitter) as described above and the central controller thereby determines the adjustment of either one of the lighting units.

Alternatively, there may be a controller that is dedicated to control only one lighting unit. Hence, there may be a controller per lighting system and the controllers are then adapted to communicate mutually the sound data for adjusting their dedicated lighting units.

The lighting system preferably is an open plan room lighting system, such as e.g. an open plan office lighting system or a hospital room lighting system. The lighting system has a controller according to the invention.

A lighting system may comprise or be a luminaire that in turn comprises or even integrates the lighting unit and either one, or both of a controller for controlling the lighting unit and a sound detector for detecting the first sound. This luminaire may be used in conjunction with a separate second sound detector or a further luminaire comprising a sound detector that can serve the purpose of the second sound detector of the first luminaire.

The lighting system preferably has multiple of such separate luminaires that communicate their sound data to each other. Hence, the system has sound detection for each of the lighting units through the different controllers.

In an embodiment, the lighting system comprises a central controller that is capable of controlling a lighting unit and a separate further lighting unit. The lighting unit may be integrated with a sound detector in a luminaire. Each of the sound detectors communicates its sound data to the central controller that controls the respective different lighting units based on the associated sound detectors.

Thus in the above lighting systems, when the lighting units and sound detectors are distributed through a space, the sound detectors enable distributed detection of sound allowing to map sound across the space while at the same time the distributed lighting units allow adjustment of illumination in different locations of the space based on the difference of sound detected at such a location and one or more of the sounds detected at other locations.

The one or more sound detectors can be integrated into each luminaire as described herein before with the advantage that a lighting unit has an associated sound detector that detects sound in the vicinity of the illumination provided by the lighting unit. Simple distribution of the luminaires provides an effective lighting control system. Alternatively, a sound detector can be mounted separate from a lighting unit, for example at the floor or desk level rather than at ceilinglighting level, in such a way that it still detects the sound at the location the lighting unit illuminates.

A lighting unit may include any kind of lighting element suitable for providing the illumination effects needed in view of the adjustments of illumination to be made. Thus if colour needs to be changed, the elements must be such that different colours can be provided, e.g. through providing at least two lighting elements for providing mutually different colours. Preferably the lighting elements comprise Light Emitting Diodes (LED) based lamps. If the direction of lighting must be changed during adjustment, then a device suitable for light element output beam steering must be included. This can be done using optical elements such as mirrors and lenses, or stages altering direction of the entire lighting elements, where the beam steering elements can be controlled by the controller.

The lighting system can further comprise a directional sound amplification system, comprising speakers associated with the lighting units, for providing a directional audio output to an area associated with the luminaire. This enables localised audio amplification to be provided, which enables people to speak more softly.

The speaker amplification for a speaker associated with one lighting unit can then be controlled based on the noise in the vicinity of the lighting unit as detected by the noise detection system. For example, the amplification can be increased if the noise level detected exceeds a threshold (which may be the same threshold as for the illumination control or it may be a different threshold).

In an embodiment, a lighting system further comprises a directional sound amplification system, comprising speakers associated with the lighting unit. The speaker amplification for a speaker associated with the lighting unit can be controlled based on the sound in the vicinity of the lighting unit. Preferably the amplification is increased if the sound level detected in the surrounding of the lighting unit exceeds a threshold level.

In the claims, corresponding features of the controller can be present as features in the lighting system and/or method with advantages described for the system and or method.

DESCRIPTION OF THE FIGURES

Examples of the invention will now be described with reference to the accompanying drawings, in which.

DETAILED DESCRIPTION OF EXAMPLES

Figure 1A:
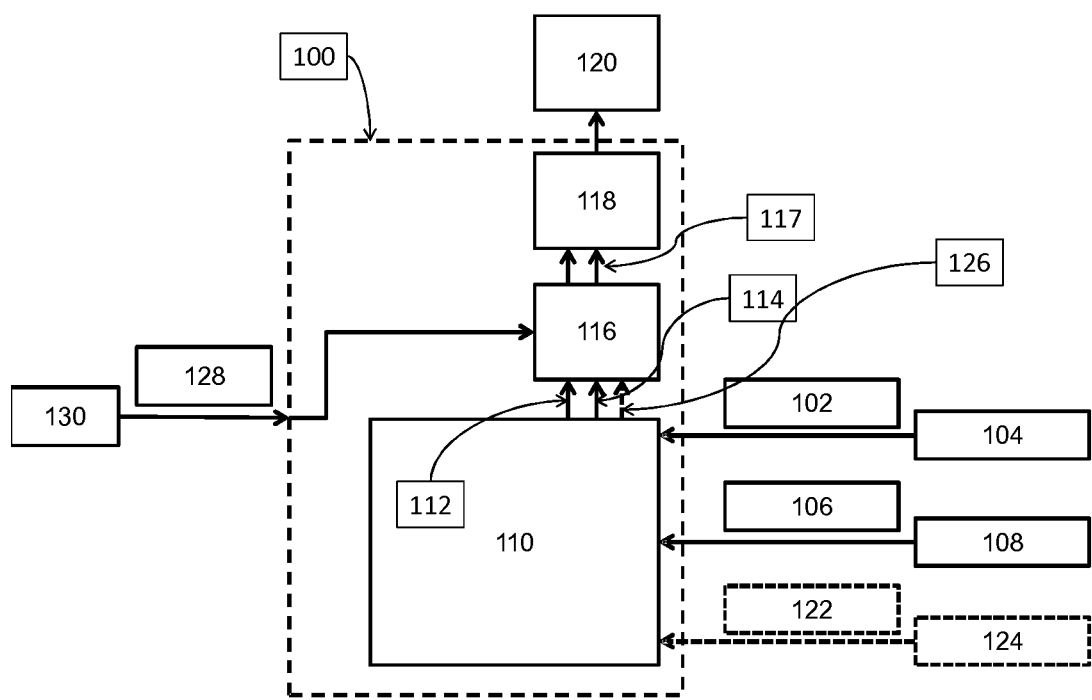
FIG. 1 shows a schematic example controller according to the invention.

A first example of a controller 100 according to the invention is schematically shown in FIG. 1A. The controller is configured with an input for first sound data 102 from a first sound detector 104 and with an input for second sound data 106 from a second sound detector 108. The sound data in this case is an electrical signal representing the sounds detected, for example in the form of an analogue or digital signal. The controller, through e.g. stepcomponent 110 extracts the values 112 and 114 for the sound levels from the respective sound data 102 and 106. Subsequently, in stepcomponent 116 the controller sets the value 114 (stemming from the sound detected from the second sound detector) as the reference value 117 for the sound level. In a next stepcomponent 118, the controller determines a deviation of the vale 112 with respect to the reference value 117. The controller then adjusts the lighting unit 120 based on the deviation.

In this particular example the deviation is the difference between value 112 and 117 and if the difference is positive, the controller lowers the illumination intensity of the lighting unit 120 proportional to the difference using a certain proportionality factor. Such a factor may be user determined and provided to the controller for influencing the responsiveness of sound feedback to the illumination are may be set during manufacture. In a variation, the controller can also increase the illumination intensity level if the deviation is negative, but this need not be the case. Other adjustments to the lighting condition can be used such as colour changes, lighting direction, lighting pattern both in space, or in time (such as flickering of illumination).

In the example, the detector 104 for detecting the first sound signal is associated with the lighting unit 120, which means that it detects sound in the location where the lighting unit provides its illumination. At the same time, the detector 108 detects sounds in a location different from that where the lighting unit provides the illumination. This preferably is a nearby location in which sounds stemming from the illumination location can be disturbing. Further setup of a lighting system will be discussed in relation to FIGS. 2 and 3. In a variation of the example of FIG. 1, the reference value 117 is set to be an average of the values 112 and 114.

In a further variation of the example, the controller is further configured with an input for third sound data 122 from a third sound detector 124. The third sound detector in this case detects sound from yet another location, different form the one where the illumination is provided and different from the one where the second detector detects sound. The sound data is again an electrical signal representing the sounds detected. In the step 110, value 126 for the sound level is extracted from these sound data. In stepcomponent 116 the reference value 117 is set to the average of the values 114 and 126. Hence the difference determined in step 118 is now with respect to at least two locations other than that in which the illumination is provided. In such a manner the average parameter value may represent a background sound level when the controller is used in the lighting system.

The example controller of FIG. 1 can be configured to have an input for a threshold value of the sound level 128 as provided by for example a user operable input device 130.

The controller in this variation can then be configured in multiple ways for using the threshold vale to compare several measured sound level values with the input sound level threshold value. For example it can compare in step 116 the value 128 with the value 114 (and/or 126 if applicable) with the purpose of deciding not to use any of these values for setting a reference if the individual value (114 or 126) exceeds the threshold value 128. As such the controller feedback is bound by the threshold level ceiling offering the user a manually input control. After all, if sound signals measured outside the illumination area become too high, they will be excluded for use in the reference value, thereby limiting the height of the reference value. Ultimately, in the above case the reference value 117 may be (temporarily) set to the threshold value if no values obtained by the controller from detectors are lower than the threshold value.

Alternatively or in addition to the above described feedback making use of the threshold value, the controller can be configured to compare the threshold value 128 with the value 112 stemming from the sound detected in the illumination area, with the aim of determining a difference between the value 112 and 128 and be able to decide to adjust the illumination only when the difference is positive (when the first sound signal level exceeds the reference sound. In effect, the threshold value or preferably a further threshold value thus can be used to define a minimum deviation that needs to be surpassed by the actual determined deviation of the value 112 of the sound level parameter of a first sound with respect to the reference value 117 before actual adjustment of the illumination takes place. Thus, the adjustment of illumination is buffered, i.e. a certain defined deviation is allowed within a boundary without actual feedback through lighting adjustment to occur. While deviation of the sound level values within the boundary may be perceived as relatively undisturbing, this embodiment thus provides a balance between feedback using illumination changes without making the illumination adjustments themselves becoming disturbing. The example more stable illumination.

The controller may have a memory for storing the threshold value. This is however not shown in the FIG. 1.

Figure 1B:
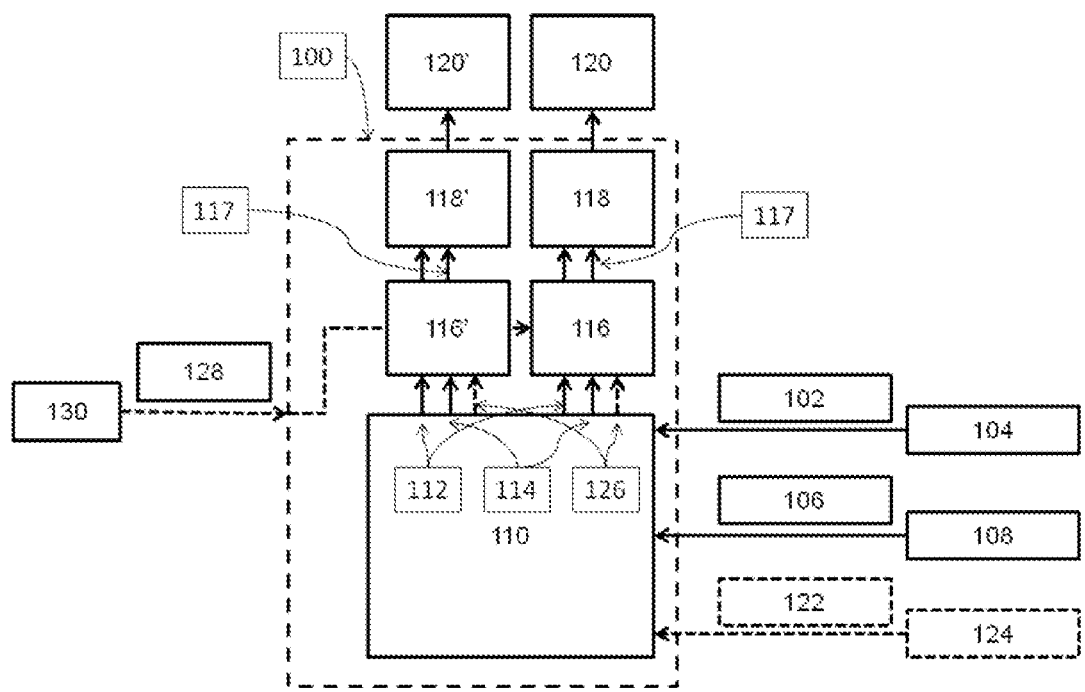

FIG. 1B shows an example of a controller capable of controlling two lighting units.

Like numerals in FIGS. 1A and 1B indicate like features. The control of the lighting unit 120 has been described with respect to FIG. 1. Starting with the example where there are only inputs of data 102 and 106, for the control of the lighting unit 120', the controller, in stepcomponent sets a further reference value 117' to the sound level value 112. In a next step/component 118', the controller determines a further deviation of the vale 114 with respect to the reference value 117'. The controller then adjusts the lighting unit 120' based on the further deviation.

In this example of FIG. 1B, the detector 108 for detecting the second sound signal is associated with the lighting unit 120', which means that it detects sound in the location where the lighting unit 120' provides its illumination. At the same time, the detector 104 detects sounds in a location different from that where the lighting unit provides the illumination, namely that location where lighting unit 120 provides its illumination as described with reference to FIG. 1A. The controller is thus capable of controlling two lighting units 120 and 120' based on two sound signal data inputs 102 and 106 in a similar manner to enable the lighting units to provide feedback to their illumination areas based on the sound detectors used in these areas. Further setup of a lighting system will be discussed in relation to FIGS. 2 and 3.

For the control of the lighting unit 120' again average values can be used when more sound detection inputs area available (e.g. the value 126 from data 122) and this can occur in a way similar as described for the control of lighting unit 120, but with using and/or excluding the sound signals appropriate for control of lighting unit 120 when associated to input 106 data. Also the threshold value can be used in a similar way as for the control of lighting unit 120.

Figure 2:
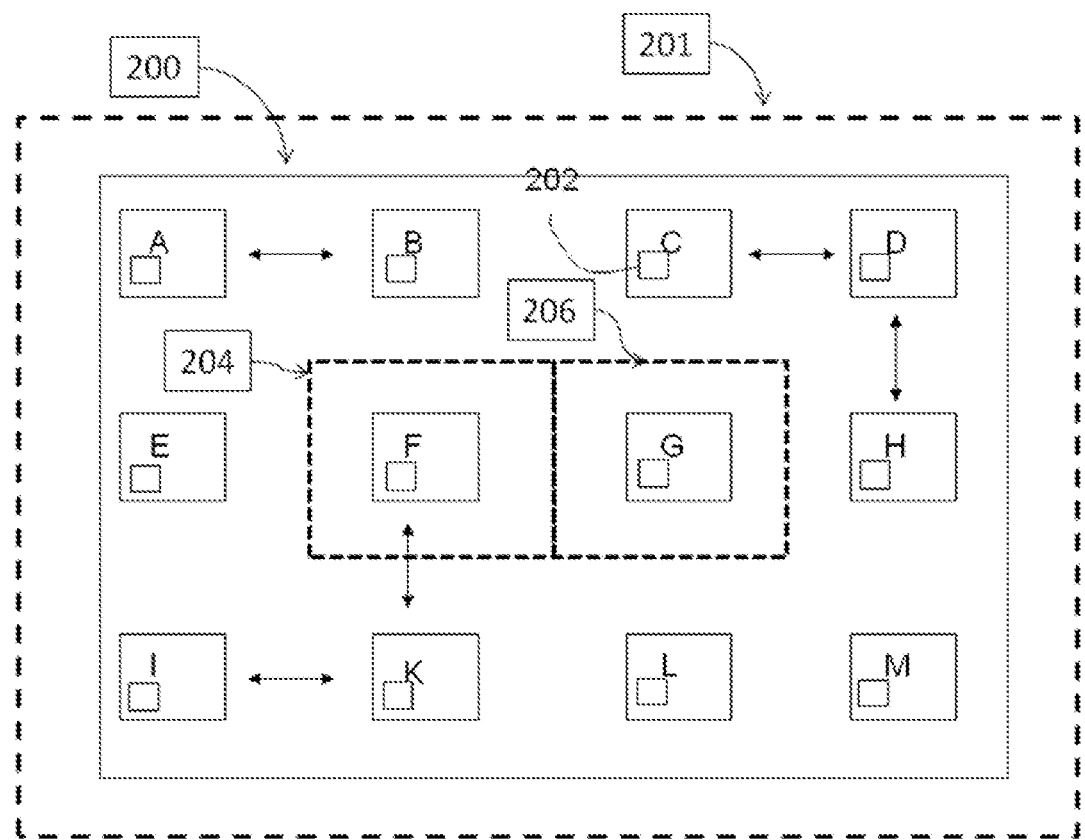
FIG. 2 shows a first example of a lighting system of the invention.

The controller of the invention is used in a system according to the invention. FIG. 2 shows a lighting system 200 placed within a space with a footprint 201. The squares labelled A to M represent luminaires each having a lighting unit (not separately shown) in which microphones 202 are integrated. For clarity only one microphone has been indicated with a numeral 202. The microphones measure local sound levels in the space and in the vicinity of the luminaires they are integrated in. The vicinity of a luminaire thus largely coincides with an area lit by the luminaire, as indicated with the area 204 fot he luminaire F and its sound dector.

Each of the luminaires comprises a controller as indicated in FIG. 1A for controlling the lighting unit within the luminaire. The luminaires communicate their measured sound levels to the surrounding luminaires by means of their communication devices (not separately shown).

Thus, if substantially more sound is created in the neighbourhood 204 (a first location in the space) of luminaire F (as shown) with respect to its surroundings (e.g. location 206 of luminaire B), then luminaire F will change its light output. In this example it will dim its light output. In this case, the reference for determining if the light output should be changed is determined by the surrounding environment. The reference is therefore relative and not absolute.

The controllers of each luminaire in this case are able to receive sound data from four surrounding luminaires. Thus for example luminare F receives sound data not only form its own microphone, but also from the microphones of luminaires B, E, G and K. The controller of luminaire F then uses these surrounding sound data to determine an average sound level for the direct neighbourhood of area 204. The controller of the luminaire F, in a way similar as described with reference to FIG. 1A for the second and third sound detectors is able to obtain four such values for the sound level from its surrounding detectors and determine from that the deviation of the sound level in the area 204 from the average sound level.

The reference is in this case is thus based on an average sound level of the surrounding luminaires, for example a fixed step above the average, or the average level itself, or a more complicated algorithm may be used. The communication between luminaires can be based on coded light or sound signals, so that no infrastructure is required. Alternatively, the communication may be wired or modulated onto the power supply to the luminaires. In a further modification communication can be wireless between the controllers and/or the microphones and the controllers. Wireless communication can be done using receivers and transmitters for wireless communication known in the art (these devices have not been shown in the Figures for clarity.

As well as changing the light output (such as intensity and/or color temperature) in response to sound above a threshold, a luminaire can also change its output, for example increase its light output parameters (a-gain intensity and/or color temperature), when the measured sound level is lower than the measured sound level derived from the surrounding luminaires.

In one example the system comprises the integrated luminaires as described for Example of FIG. 2. This however need not be the case as the microphones and/or the controllers may be mounted separately from the lighting units. As long as there is one microphone for detecting the sound in one illumination area of the space, the system will be able to perform its function in and around this area.

Figure 3:
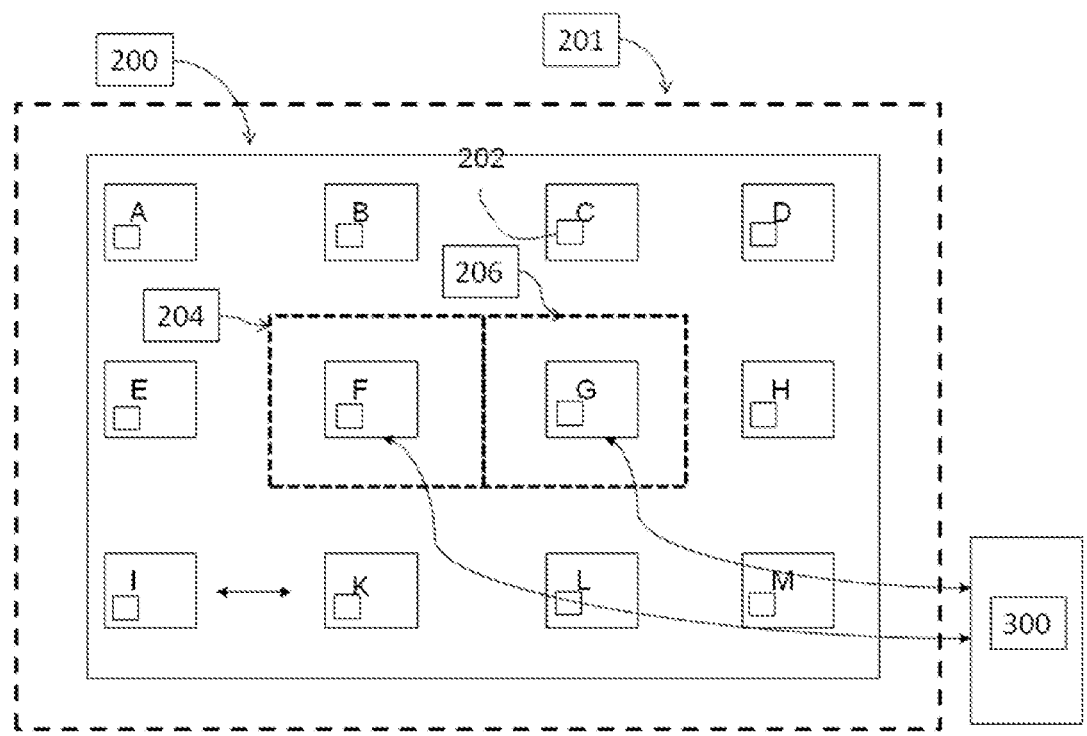
FIG. 3 shows a second example of a lighting system of the invention.

In a second example shown in FIG. 3, there is again a lighting system as described with reference to FIG. 2, however with the difference that in this case there is a central controller 300 communicating with each of the lighting units and detectors of the luminaires A to M. There are no other controllers present in the luminaries except for maybe thos that receive wireless communication signals and translate these into the respective illumination change signals for the luminaires. In FIG. 3. only two communication control connections (double arrows) between the controller and luminaries F and G are indicated while for clarity those for luminaires B, E and K have been omitted. The controller now is one of the type described with reference to FIG. 1B which is able to control multiple lighting units, in this case 16 (luminaires A to M). It is also capable of receiving inputs from 16 sound detectors. After having received and processed the sound data, the controller provides the correct control signals to the different lighting units.

The advantage of a central controller is that more complex algorithms may be used. There can be correlations of sound and location (for example to persons sitting at their desk and chatting) that may be treated differently than other type of correlations (such as a conversation at a meeting table). The algorithms can be fixed or self-learning as the effectiveness of achieving sound reduction can also be measured.

A third example combines the lighting control with an active sound amplification system.

A localised sound amplification system has been proposed by the applicant, in which speech generated by people in a sound space is picked up and amplified, before being sent by a directional speaker back into the same sound space. By allowing users to speak more softly, the system enables the speech of users in the sound space to be converted from general multidirectional sound (which can easily be overheard) into directional sound into the sound space.

Figure 4:
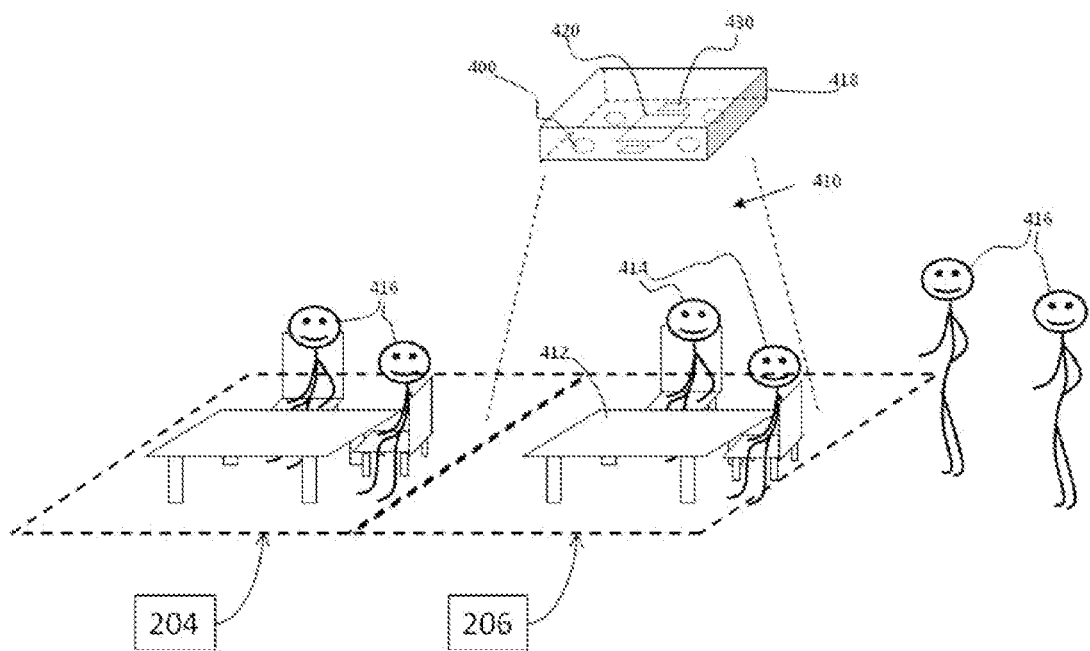
FIG. 4 shows a directional sound amplification system which can be used in combination with the lighting system of the invention.

FIG. 4 shows the localised amplification system which can be combined with the lighting control of the invention such as those of FIGS. 2 and 3.

A sound space 410 comprises an area 206 where occupiers of the area can converse with each other without being heard by or disturbing other people in the vicinity and which is illuminated by a luminaire represented with for example G in FIGS. 2 and 3. For example, the sound space 410 comprises a table 412 where two people 414 are having a discussion. Other people 416 nearby are not disturbed. This is achieved by reducing the volume with which the people 414 need to speak, and providing amplification of their speech in a directional way within the space 410. The system avoids adding masking noise and thereby avoids increasing the overall noise level in the total space.

The system has an overhead unit 418 (a housing) which includes loudspeakers 420, the lighting unit 42 (which is controlled in the manner explained above) and a microphone arrangement 430 (which is used by the lighting control system as described above). The microphone arrangement 430 may be part of the overhead unit 418 or it may be part of the table 12, or it may be a freestanding microphone or set of microphones in the sound space.

The aim of the system is to amplify the speech of people 414 addressing the other (informal) meeting members 414 by using a loudspeaker or loudspeaker array which causes radiation of the sound mainly to people 414, while minimizing the sound radiated towards people 416. The added amplified sound is steered towards the desired directions and the level of added sound radiated via the loudspeakers can be amplified to a higher level than the original speech signal so that the person 414 speaking can speak with a lower voice.

In one example, the overhead unit 418 comprises a dome, with a loudspeaker array integrated in the dome directing the speech received by microphones mounted at the rim of the dome. The sound is directed mainly towards the table 412 suppressing sound radiation in directions away from the table and as such minimizing the annoyance of people 416 who are not sitting or standing in the vicinity of the table.

The loudspeaker system can be integrated into the lighting system.

The lighting can be inviting to attract people to the position of the system in an intuitive way. People are usually attracted by higher light levels and warmer light. This creates an inviting meeting point in an open plan office, with minimal distraction to other people in the same room. An open informal work space near the work desks is very efficient for collaboration.

The integration of the system into an overhead unit means the loudspeaker system can be installed only at a single or a few points in the room, instead of all over the ceiling.

In accordance with the invention, the lighting is controlled if the sound level increases to a point where it is judged that it will affect others in other areas of the open space. For example, the lights may slowly start to dim (or start blinking, or give a coloured light effect) when the speech becomes too loud, thus giving visual feedback to the speakers in the meeting to lower their voices.

In addition, the amount of amplification can be adjusted dependent on the sound that is measured in the environment. If too much sound is being created by the conversation underneath the amplification system, then the amplification can be increased (and vice versa). Increasing the amplification provides more feedback to the persons underneath the luminaire and it is known that persons will lower their voice in such circumstances. Thus, the feedback to the users to lower their voices can be both visible and audible.

In addition to the use of lighting to encourage the reduction of sound levels, the light effect is also able to react to the speech level and the speech content at the meeting point. Light level, colour temperature, colour, distribution etc. may be adapted to the type of meeting (brainstorm or informal coffee discussion etc.). The lighting conditions may be set to be optimal if the sound levels are acceptable and non-optimal if the users generate sound at an unacceptable level. This feedback will again lead to more modest noise levels.

In the version of FIG. 4, a two-dimensional loudspeaker array is positioned right above the area where the people having a meeting are located. The speech is picked up by microphones and reproduced by the loudspeakers in such a way that the intelligibility is increased (by suitable signal processing to remove noise), while the annoyance for people who are not participating in the conversation is minimized.

As mentioned above, in the general invention, the controller may implement a self-learning algorithm that adjusts the feedback system to obtain the best results. In addition to controlling individual lighting units, the general lighting can be dimmed if the general noise level is too high.

The sound amplification system can be used if the sound level is too high. Thus, the lighting feedback control may be used as a first measure, and the audio feedback control can be used as a second measure.

The feedback loop will have a slow response, for example having a typical adjustment time of 5-10 minutes.

As mentioned above, various control algorithms are possible. These can range from simple averaging and thresholding to more complex learning algorithms. Generally, an estimation of the general noise level can be made, and a sound level which is a fixed amount above this (e.g. a given number of dB or a percentage increase in dB) triggers the illumination control to try to influence people to reduce the local sound level. The implementation of the controllers required to perform the required control algorithm is completely routine to one of ordinary skill in the art.

At the limit, the invention can be implemented as one lighting unit with the feedback control system, but there will be other (natural or artificial) lighting within the room. The one lighting unit with the feedback control can then be used for lighting an area where conversations are encouraged—for example a meeting space, whereas the other areas of the room may be office spaces. The invention can however be implemented with many lighting units with the feedback control as explained above. The general sound level can be derived from the microphones associated with the individual lighting units or with a dedicated additional microphone or microphones.

The microphones essentially detect sound levels. The general sound level can be considered to be a noise level. The sound level in the vicinity of a lighting unit will also be considered as noise to those people in other areas of the room. Thus, the detection of sound levels essentially equates to the detection of noise levels.

The detected sound level used for controlling the lighting conditions is not a command, so the system is not implementing voice actuated control. Instead, the sound level detected is simply a measure of local sound volume. There is no need for interpretation of speech, or detection of pre-programmed sound patterns (such as clapping), so that the system provides its function in a totally passive manner, without needing any user command input in order to detect when the lighting conditions need to be adapted.

However, additional functionality can be added, but without requiring commands from the users. For example, sound processing can be used to identify sounds which are not speech, and can therefore be ignored. These sounds may be printer noise, coffee machine sounds etc. Thus the sound which is compared to the threshold level may only be sounds than can be caused by human voices.

The preferred implementation of the system requires users to be trained to know that the change in illumination conditions is a signal that they need to lower their volume. Thus, any lighting change can be used, including brightness change, colour change, or a flash pattern (or a combination of these). A decrease in brightness may also cause people to lower their voices intuitively, but those users would still preferably be advised that dimming lighting is an indication that noise levels are too high.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A controller for controlling an illumination to be provided by a lighting unit, wherein the controller is adapted to:
   obtain a value of a parameter of a first sound,
   obtain a value of the parameter of a second sound,
   base a reference value of the parameter on at least the value of the parameter of the second sound,
   determine a deviation of the value of the parameter of the first sound from the reference value of the parameter, and
   adjust the illumination based on the deviation,
   wherein the controller is further adapted to:
   obtain a threshold value of the parameter;
   compare the value of the parameter of the first sound with the threshold value of the parameter; and
   adjust the illumination only if the value of the parameter of the first sound is higher than the threshold value.

2. The controller as claimed in claim 1, wherein the controller is further adapted to:
   obtain a value of the parameter of a third sound; and
   base the reference value of the parameter further on the value of the parameter of the third sound signal.

3. The controller as claimed in claim 2, wherein the controller is further adapted to:
   compare the value of the parameter of the second sound with the threshold value of the parameter;
   base the reference value of the parameter not on the value of the parameter of the second sound if this value is higher than the threshold value.

4. The controller as claimed in claim 1, wherein the controller is further adapted to:
   base the reference value of the parameter not on the value of the parameter of the first sound.

5. The controller as claimed in claim 1 wherein basing the reference value of the parameter comprises determining an average value of the values of the parameter of the sound obtained by the controller including at least the value of the parameter of the second sound.

6. The controller as claimed in claim 1 to wherein adjusting the illumination comprises adjusting one of, or a combination of: an illumination color temperature, an illumination intensity, an illumination direction and an illumination pattern.

7. The controller as claimed in claim 1 wherein adjusting the illumination based on the deviation comprises adjusting the illumination proportional to the deviation.

8. The controller as claimed in claim 1 wherein the controller is further adapted to start adjusting of the illumination after elapse of a delay time between obtaining of the value of the parameter of the first sound or obtaining of the value of the parameter of the second sound and the adjusting of the illumination.

9. The controller as claimed in claim 1 wherein the controller is further adapted to perform successive cycles each including at least the following steps:
- obtaining the value of the parameter of the first sound,
- determining a deviation of the value of the parameter of the first sound from the reference value of the parameter, and
- adjusting the illumination based on the deviation.

10. The controller as claimed in claim 1 for controlling a further illumination to be provided by a further lighting unit, the controller being further adapted to:
- base a further reference value of the parameter on at least the value of the parameter of the first round,
- determine a further deviation of the value of the parameter of the second sound from the further reference value of the parameter, and
- adjust the further illumination based on the further deviation.

11. A lighting system comprising:
- a controller as claimed in claim 1;
- the lighting unit for providing the illumination to a first part of a space.

12. The lighting system as claimed in claim 11 further comprising:
- a first sound detector for detecting the first sound in the first part of the space.

13. A lighting system as claimed in claim 12 further comprising:
- a further controller, wherein the further controller is for controlling a further illumination to be provided by a further lighting unit instead of controlling the illumination to be provided by a lighting unit, the deviation is a further deviation, and the first and second sound are interchanged for the further controller,
- the further lighting unit for providing the further illumination to a second part of the space, the first part of the space being different from the second part of the space,
- a second sound detector for detecting the second sound in the second part of the space.

14. The lighting system as claimed in claim 11 further comprising:
- a second sound detector for detecting the second sound in a second part of the space, the first part of the space being different from the second part of the space.

15. The lighting system as claimed in claim 11, comprising a speaker system for providing a directional audio output to the first area within the space.

* * * * *